United States Patent [19]
Edgar et al.

[11] Patent Number: 5,537,530
[45] Date of Patent: Jul. 16, 1996

[54] VIDEO EDITING BY LOCATING SEGMENT BOUNDARIES AND REORDERING SEGMENT SEQUENCES

[75] Inventors: Albert D. Edgar, Austin; Steven C. Penn, Georgetown, both of Tex.

[73] Assignee: International Business Machines Corporation, Armonk, N.Y.

[21] Appl. No.: 376,696

[22] Filed: Jan. 23, 1995

Related U.S. Application Data

[63] Continuation of Ser. No. 929,063, Aug. 12, 1992, abandoned.

[51] Int. Cl.⁶ .................................................... G06T 5/50
[52] U.S. Cl. .................................................... 395/157
[58] Field of Search .................................... 395/152–157; 345/119; 360/14.2; 348/700; 382/190

[56] References Cited

U.S. PATENT DOCUMENTS

| | | | |
|---|---|---|---|
| 3,994,591 | 11/1976 | Gibbard | 356/407 |
| 4,100,607 | 7/1978 | Skinner | 360/14.2 |
| 4,120,003 | 10/1978 | Mitchell et al. | 348/9 |
| 4,231,061 | 10/1980 | Freeman | 358/507 |
| 4,259,661 | 3/1981 | Todd | 382/27 |
| 4,694,329 | 9/1987 | Balmeres-Sarabia et al. | 348/586 |
| 4,823,184 | 4/1989 | Belmares-Sarabia et al. | 348/700 X |
| 4,855,813 | 8/1989 | Russell et al. | 348/559 |
| 4,862,264 | 8/1989 | Wells et al. | 348/416 |
| 4,876,597 | 10/1989 | Roy et al. | 348/143 |
| 4,937,685 | 6/1990 | Barker et al. | 360/14.1 |
| 4,954,969 | 9/1990 | Tsumura | 395/154 X |
| 4,985,784 | 1/1991 | Tsuboi et al. | 358/342 |
| 5,032,905 | 7/1991 | Koga | 348/700 |
| 5,065,345 | 11/1991 | Knowles et al. | 395/154 |
| 5,081,592 | 1/1992 | Jeng | 345/119 X |
| 5,083,860 | 1/1992 | Miyatake et al. | 352/129 |
| 5,099,322 | 3/1992 | Gove | 348/700 |
| 5,103,305 | 4/1992 | Watanabe | 348/700 X |
| 5,109,482 | 4/1992 | Bohrman | 395/154 |
| 5,111,409 | 5/1992 | Gasper et al. | 395/152 |
| 5,134,472 | 7/1992 | Abe | 348/700 |
| 5,202,961 | 4/1993 | Mills et al. | 395/159 |
| 5,204,706 | 4/1993 | Saito | 395/129 |
| 5,237,648 | 8/1993 | Mills et al. | 395/152 X |
| 5,262,865 | 11/1993 | Herz | 348/705 |
| 5,267,034 | 11/1993 | Miyatako et al. | 348/352 |
| 5,274,453 | 12/1993 | Maeda | 348/700 X |
| 5,307,456 | 4/1994 | Mackay | 395/154 |
| 5,388,197 | 2/1995 | Rayner | 395/154 |
| 5,442,716 | 8/1995 | Otsu et al. | 382/190 X |
| 5,459,830 | 10/1995 | Ohba et al. | 395/152 |

FOREIGN PATENT DOCUMENTS

| | | |
|---|---|---|
| 0378393A3 | 7/1990 | European Pat. Off. . |
| 0489301A1 | 6/1992 | European Pat. Off. . |
| 0526064A3 | 2/1993 | European Pat. Off. . |
| 60-172892 | 6/1985 | Japan . |

*Primary Examiner*—Heather R. Herndon
*Assistant Examiner*—Anton W. Fetting
*Attorney, Agent, or Firm*—Robert M. Carwell

[57] ABSTRACT

Frames associated with sequences of video source material representing a series of scene changes are digitized. A computerized process analyzes the digitized information and identifies one or more frames of the source material associated with and representative of each such scene change and/or sequence. The representative frames are displayed, A selected frame from the display will thereby cause automatic selection and association of a sequence of frames comprising a corresponding video sequence from which the frame was selected for subsequent playback, In a preferred embodiment, the entirety of the representative frames or a subset thereof are specified and ordered. The order of the corresponding frames of video segments or scenes corresponding to each such selected and ordered representative frame are thereby automatically also ordered. Simplified video editing is accomplished by manipulating these representative frames, each associated with a different scene or video sequence.

14 Claims, 7 Drawing Sheets

$$D_{AB} = \sum_{n=1}^{n=16} (Pn_A - Pn_B)^2$$

VIDEO EDITING BY LOCATING SEGMENT BOUNDARIES AND REORDERING SEGMENT SEQUENCES

This is a continuation of application Ser. No. 07/929,063 filed Aug. 12, 1992.

FIELD OF THE OF THE INVENTION

This invention relates to video editing, and, in particular, to systems and methods for identifying scene change boundaries in video segments and ordering sequences of video segments in relation thereto.

BACKGROUND OF THE INVENTION

In the evolving field of video editing, the objective has been to select segments of video source material for purposes of video editing including the reordering of segments for subsequent viewing as desired, selective viewing, and the like. As the art developed, techniques became available for digitizing vast quantities of video source material thereby facilitating the ability to very conveniently splice and otherwise edit these vast quantities of video source material. When attempting to design video editors, those skilled in the art immediately became faced with many problems when the target user was essentially a video novice. Such a class of users was of particular interest to the industry, primarily due to the large number of members they represented when compared with video professionals and skilled amateurs. However, provision for practical video editing to this market segment was also extremely challenging because such users typically cannot accommodate or tolerate any unnecessary complexity in video editing systems.

Throughout the course of development of video editing art, such complexity unfortunately typically became built into professional editors due to the need for maximum flexibility. Accordingly, the designer of equipment and systems for mass use in video editing faced huge technical challenges in making such systems truly easy to use as well as useful.

As but one example, the presence of video cameras or "camcorders" have become popular with the general public. The typical user desires the capability to edit video source material generated from such cameras but unfortunately the cost, complexity, and limited availability of appropriate editing equipment makes this totally prohibitive for the vast majority of camcorder owners. As previously noted, with the advent of digital video becoming commonplace, the possibility of providing video editing equipment for mass use became feasible for the first time due to the reduced cost of such equipment. However, making the editing process convenient to the mass market still nevertheless remained an immense challenge.

Many attempts were thus made in the art to find critical paradigm changes to facilitate simplified video processing and editing for the masses. However they all typically missed a critical point by continuing to demand that the user deal with video on a frame-by-frame basis. Such a burden was of course quite acceptable for the video professional wherein each video sequence and often relatively small series of video frames were extremely valuable assets in the hands of skilled professional editor. Accordingly such a trained person could justify the expense and time required to deal with video source material on a frame basis. However, it became clear that the mass user still required a more natural and simple way of dealing with editing and organization of video segments.

One metaphor that seemed attractive and of potential application was that of scanning text in a newspaper. Video material was long known as being superior for concentrated and fixed speed communication that develops along a single time dimension. However the two dimensions of printed material have long been known as superior for browsing and editing for the information consumer. The reader typically looks at headlines placed on a large two dimensional space and quickly selects the articles of interest, thereby avoiding having to read every word in the paper to find wanted material. In like manner, books were obviously provided with tables of contents and indices for similar purposes. Similar ease of access to video was highly desired wherein less sophisticated users might be provided with an automatic way to quickly scan video to identify wanted material and to be reminded of forgotten contents. Thus a system and method were highly desired which were designed to allow the video developer a critical paradigm shift to encourage and greatly expanded video applications, combining the advantages of video and printed material. This was desired in order to form a new user-interactive communication tool which would be extremely powerful for education, business, and entertainment purposes. Put simply, a solution was needed which provided a critical concept permitting appropriate paradigm shifts for greatly simplified video operations.

In one system which attempted to effect a more simplified correlation between desired video segments and means for recalling the content of these segments to the user or editor, one or more still frames was identified with a sequence of frames comprising a video segment for purposes of editing, wherein the still frame was representative of the segment. In this manner, still frames served as convenient "place holders" or reminders to the editor of the content of the related video segment source material.

Such a system produced the need for the user to continuously scan through video frames during the editing process once the association was made between the frame or frames and its corresponding sequence. The system required such manual scanning of frames in order to make the association in the first place. Thus, the problem remained of easing the task of selecting boundaries between segments, and a means was highly sought after for simplifying this process. This object and the foregoing goals have been fully met by the subject invention, a description of which hereinafter follows which may be more easily understood with reference to the following drawings wherein:

SUMMARY OF THE INVENTION

A plurality of frames associated with sequences of video source material representing a series of scene changes are digitized. A computerized process analyzes the digitized information and identifies one or more frames of the source material associated with and representative of each such scene change and/or sequence.

The representative frames are displayed. A selected frame from the display will thereby cause automatic selection and association of a sequence of frames comprising a corresponding video sequence from which the frame was selected for subsequent playback.

In a preferred embodiment, the entirety of the representative frames or a subset thereof are specified and ordered. The order of the corresponding frames of video segments or scenes corresponding to each such selected and ordered representative frame are thereby automatically also ordered. Simplified video editing is thereby accomplished by manipulating these representative frames, each associated with a different scene or video sequence.

DETAILED DESCRIPTION OF THE PREFERRED EMBODIMENT

Figure 1:
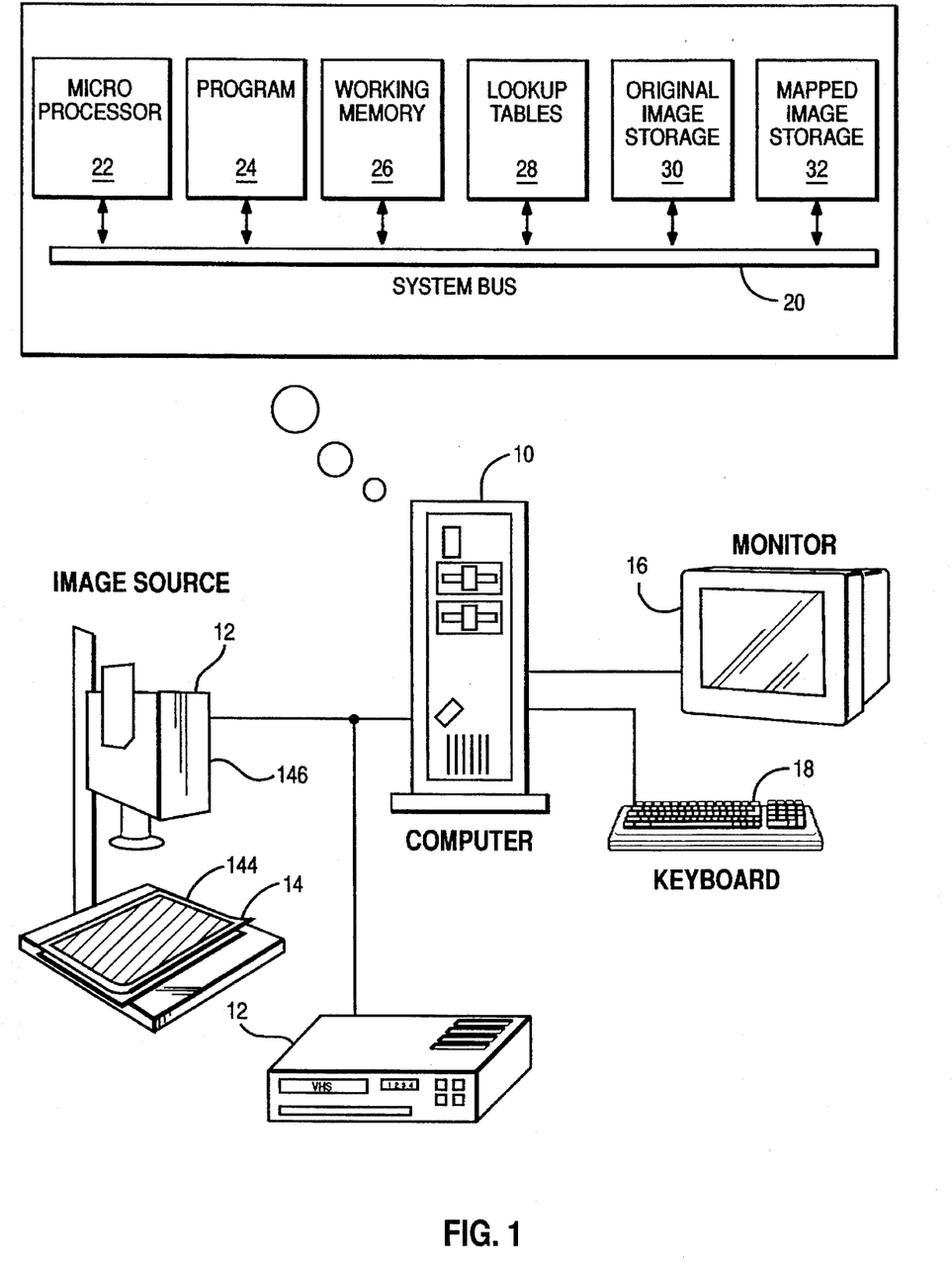
FIG. 1 is an illustration (partially in block diagram form) of a representative computerized system for implementing the system and method of the present invention.

Referring to FIG. 1, a typical system providing the environment for implementing the invention may be seen depicted therein and will first be described. A computer 10 such as a PS/2™ (Trademark of IBM Corporation) system will execute the steps of the invention via a program loaded therein implementing the process previously described. The computer will first capture, by means of an appropriate source, such as a camera 12, scanner or via some other medium, an image based upon a source subject 14 which the computer 10 will then digitize for subsequent processing. Alternatively, the images may have been pre-stored in a VCR as the image source 12 and input into computer 10. The mapped image created in accordance with the invention may be stored for display on a conventional monitor 16 for human observation or otherwise stored on media for eventual display. A conventional keyboard 18 and other I/O and user-interface devices will further be provided to the computer 10 for interacting to effect the invention. Inside the computer 142, a system bus 20 is provided which ties together the microprocessor 22, the previously described program 24, which instructs the microprocessor 22 how to execute the steps of the invention, and working memory 26, which the microprocessor 22 utilizes to store intermediate calculations, various lookup tables generally represented at reference numeral 28, the original stored image 30 captured by the camera 12 and the mapped image 32.

Figure 2:
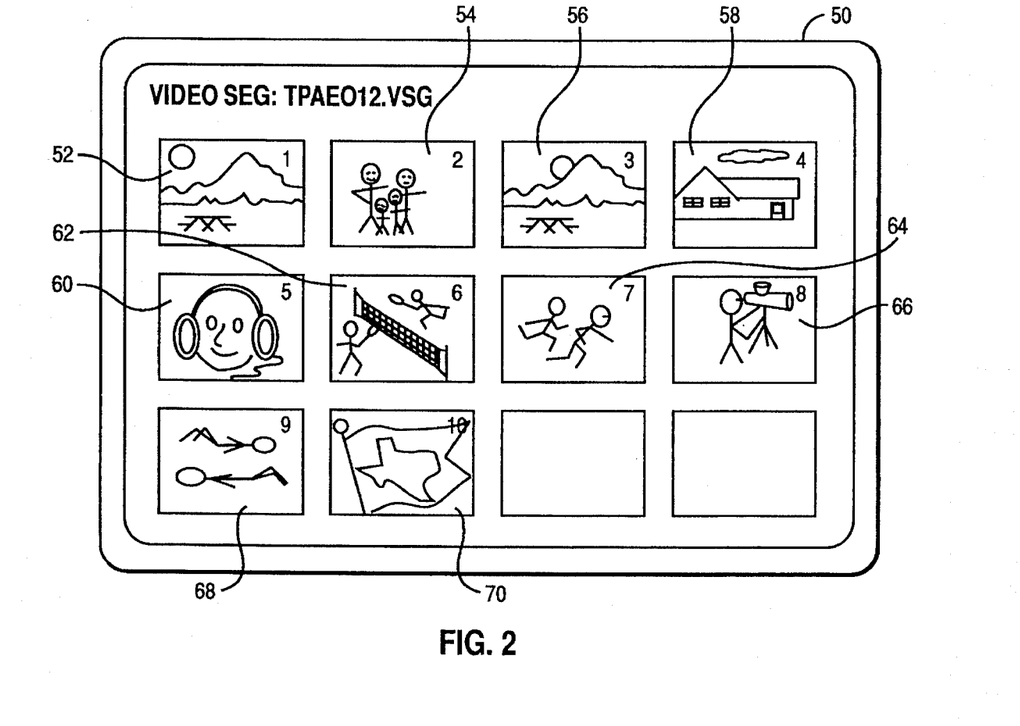
FIG. 2 is an illustration of a display appearing on the monitor of FIG. 1 depicting individual frames representative of corresponding video scenes or segments.
Figure 3:
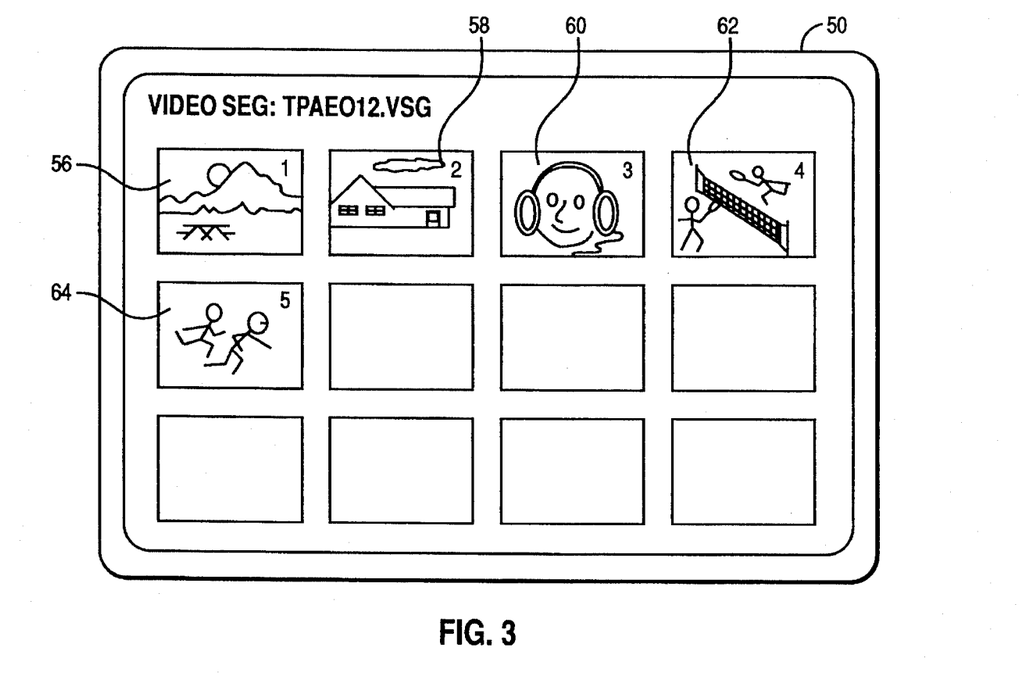
FIG. 3 is an illustration of a typical screen appearing on the monitor of FIG. 1 showing the reordering of a portion of the frames of FIG. 2, thereby reordering corresponding video segments.
Figure 4:
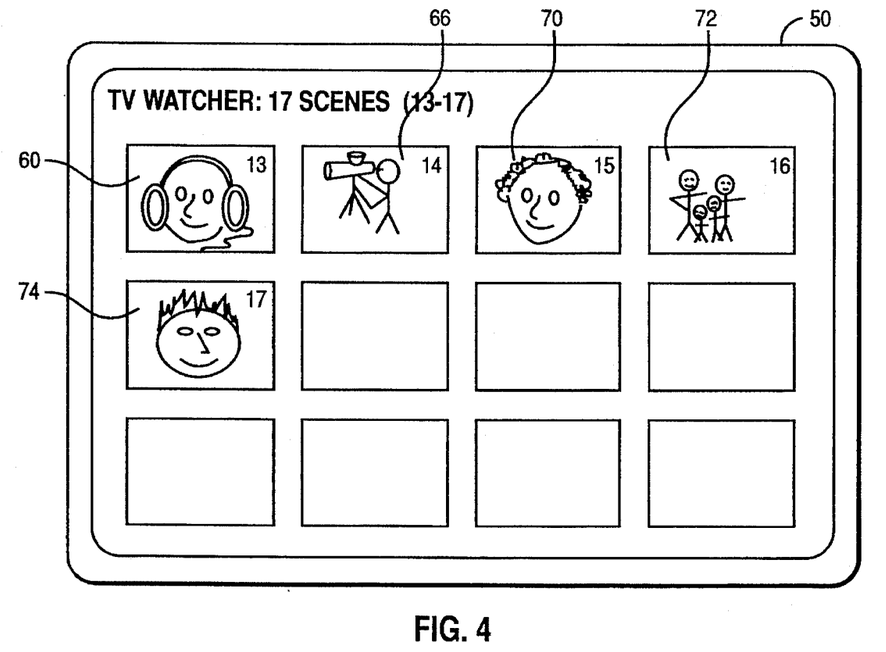
FIG. 4 depicts yet another typical screen which might appear on the monitor of FIG. 1 wherein individual still frames correspond to correlative video segments in an application of the invention adapted for viewing of television, videotape, or like source material.
Figure 5A:
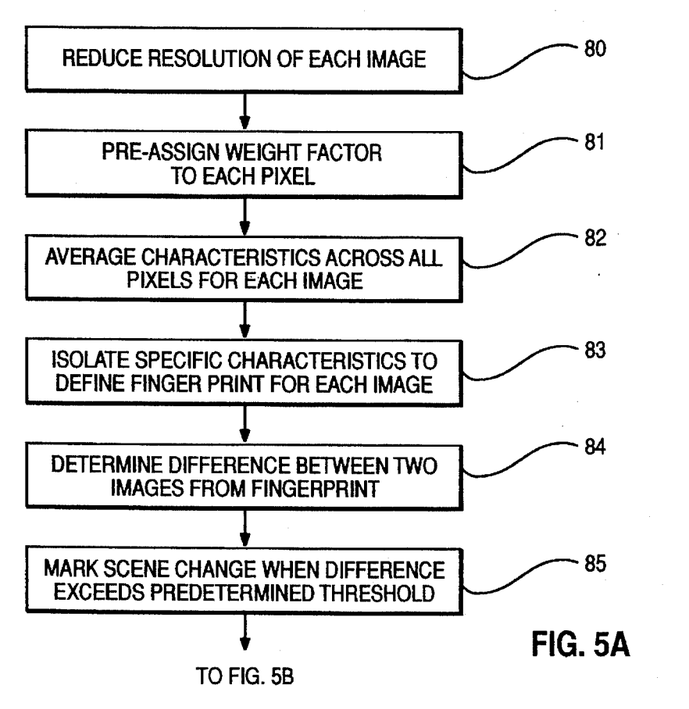
FIGS. 5A–5C are flow diagrams of a computer program executed by the computer system of FIG. 1 for purposes of detecting boundaries in video segments.
Figure 5B:
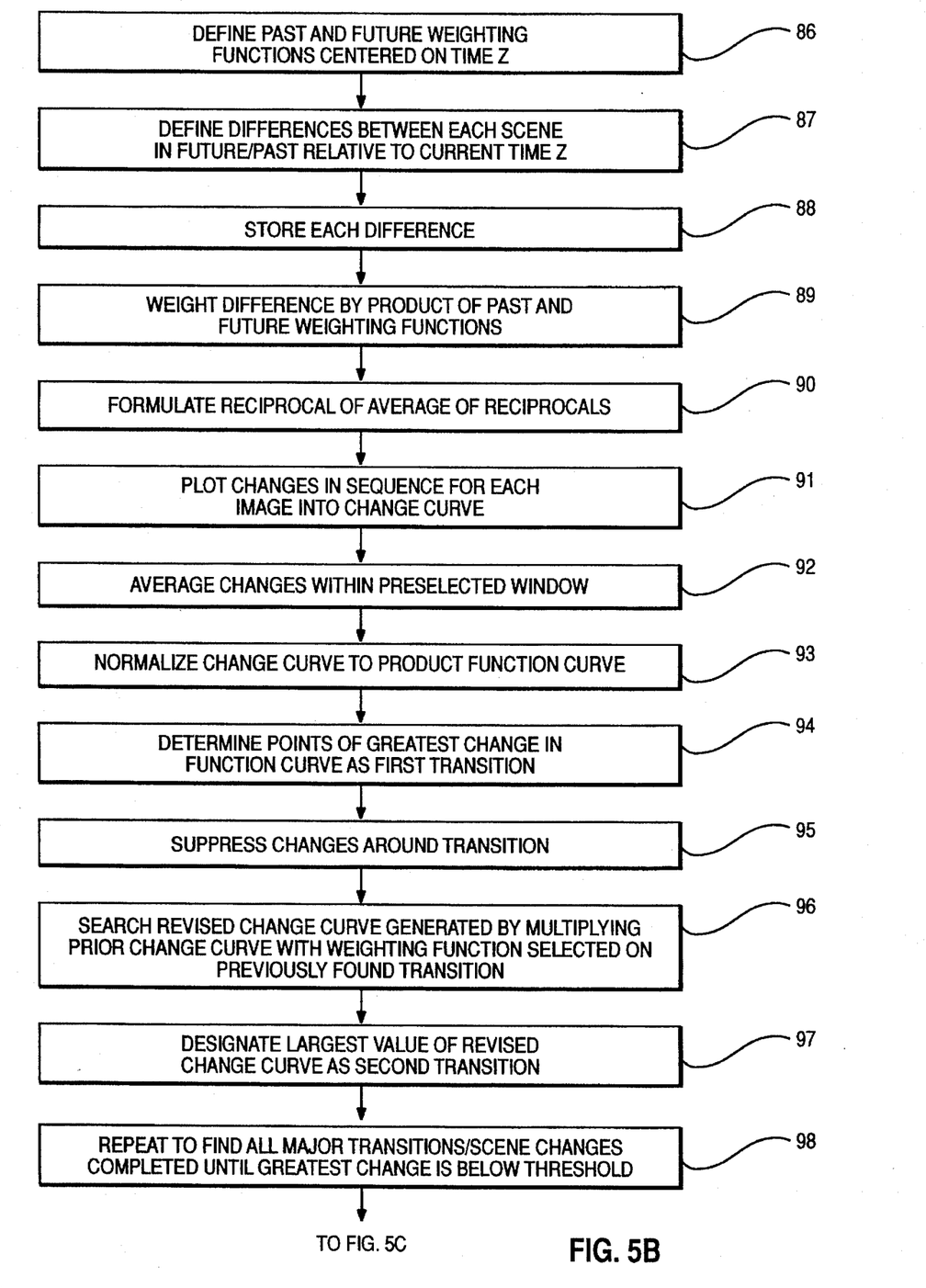
Figure 5C:
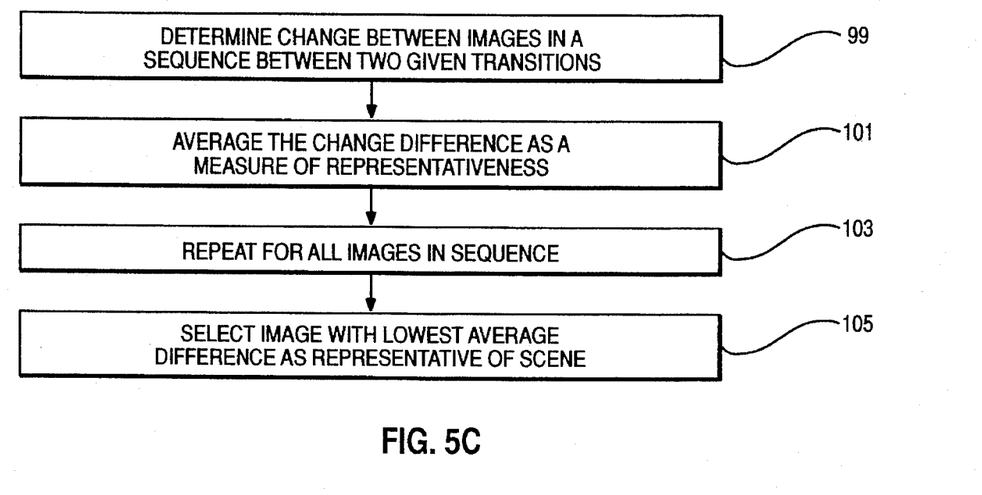

Referring now to FIGS. 2–4, a general description of the operation of the invention will be provided with particular reference to the externals, (e.g., user interaction within perception of the user interface). It will be recalled from a discussion of the system of FIG. 1, that video source material is first digitized, and the computer system then is employed in conjunction with the methods discussed herein to identify boundaries as desired in the video material. Typically these boundaries will take the form of differing video segments or scenes each represented by a characteristic corresponding frame or frames from which the user may recall the content of the subsection of the video source material associated with the particular frame or frames.

Accordingly, in FIG. 2, after the foregoing process has been completed, a typical screen 50 will be generated and displayed on the monitor, this screen 50 in turn being comprised of a display of a plurality of these frames 52–70. In the application being discussed (e.g., that of a video editor), the objective is to enable a user to quickly determine contents of video segments being edited and to manipulate these segments. Thus, this is the purpose of presenting the user with a display of the screen 50 showing the plural still images 52–70 which represent video frames associated with corresponding particular scenes. In a preferred embodiment, these individual still frames 52–70 would be depicted in the screen 50 in some natural sequence such as time-sequenced by column within rows.

Still referring to FIG. 2, these selected frames or "stills" from the digitized video would obviously inform the user of the video contents of its respective segment. In the simplified example depicted in FIG. 2, these frames represent a vacation sequence comprised of three frames 52–56, a tour of a house 58, a recording session 60, a tennis sequence 62, a foot race 64–68 and, finally, a parade sequence 70. In operation of the system of the present invention, the user would operate directly on these frames (e.g., selecting and manipulating frames 64–68) in order to copy and order the corresponding race video segments for example without ever having to identify the frame boundaries of that segment. Such user interaction could be effected in a number of manners well known in the art, such as by use of a pointing device like a mouse, or the like. It is contemplated that frequently the user would consolidate selected ones of these stills so that one still might represent each sequence, inasmuch as a segment created in accordance with the editing by the invention would simply be a meaningful collection of video from the user's perspective, which was not necessarily sequential as originally created in the source material. In other words, the user may thus, during the process contemplated by the invention, select a range of stills that made up one sequence and then select a still which was to represent the sequence.

As an example of the foregoing, if the user consolidated stills 52–56 in order to reflect the vacation sequence, he or she might select the sunset image of frame 56 to represent the entire scene corresponding to the portion of the video source material, which in turn corresponds to source material from which the stills 52, 54 and 56 were selected. In like manner, the user might consolidate stills 64–70, deciding that the parade and the race were one segment in his or her mind, and might, thus, select the race starting image of frame 64 to represent this video segment of the entire video source material.

In such a case, the system of FIG. 1 would thereafter present a next screen 50, as shown depicted in FIG. 3, containing a differing edited set and order of frames selected from the screen 50 of FIG. 2. More particularly, with this new simplified consolidated representation of the video sequence as shown in FIG. 3, the user could then access each sequence by simply pointing to or selecting the associated scene frame as part of the video operation.

Referring more particularly to FIG. 3, it will be noted that only frame 56 was selected and displayed to correspond to the vacation sequence of video associated with frames 52–56. Frames 58, 60 and 62 continue to be represented, in order, representing the home tour, recording session and tennis sequence. However, it will again be noted that a single frame 64 is now shown which is intended to represent the entire video segment associated with frames 64–70. As just noted, the user could access each sequence by simply pointing to or selecting the associated scene frame; however, this mode of operation would not prevent the user from accessing the video at the frame level. Moreover, the system provides for the user to display the scene as automatically determined by the system 10, whereby the user may view the boundaries selected and make adjustments thereto if desired. A key feature of this form of operation and implementation of the system including the algorithms discussed herein, is that it provides the ability to the user of treating video in the manner the user would normally treat textual material.

In the example under discussion, therefore, the user could point to or otherwise select the frame 56 in frame 64, and thence copy the video segments or scenes corresponding thereto to a tape or another video segment without ever having to step through the sequential video frames. The user simply employs digitized tapes such as those generated from a camcorder, pages through several displays showing scene frames such as those depicted in FIG. 3, selects the desire scenes, places them in the preferred order, adds a title and a new tape may thence be generated containing only the video segments and in the order thus specified by the user.

As will now be described, "video editing" can refer to a rel-time selection of segments to be viewed when perusing a video sequence for entertainment, education, or business. This is the same sense in which a reader "edits" a magazine in real-time by selecting which articles to read, and what order to read them.

Turning now to FIG. 4, in order to illustrate the numerous applications of the invention, yet another embodiment will be described, an application for television viewing. Numerous video applications result from the invention comprising enhancements to video equipment in order to aid the user in selective viewing. In such an application, similar logic to that employed with respect to FIGS. 2 and 3 are applicable. As an example of this application, the video cassette recorder (VCR) form of image source 12 of FIG. 1 may be provided with logic built in or provided by means of an interface to the computer 10 wherein the computer is programmed to execute the logic. The user or computer 10 would program the VCR 12 to record desired source material such as a talk or news show. In accordance with the invention as previously described, the system 10 would not only cause the VCR 12 to record the desired material, but would automatically identify the frames that represented scene changes in the recorded material of the shows. When the user thereafter prepares to view the recorded material, the system would present screens 50, similar to those of FIGS. 2 and 3, for the user to examine. Each such screen, in like manner to the previous examples, would contain several pages of frames or stills representing the contents of the recorded material, and, more particularly, each such frame representing a boundary or scene change as desired in the recorded material. The user would again simply point to or otherwise select out those scenes represented by individual frames which the user desired to view, specifying the order of scene sequence in the manner described, whereupon the VCR 12 or VCR 12-computer 10 combination would cause playback and display on the monitor 16 of only the selected material in the order thus specified.

As an example of the foregoing with reference to FIG. 4, the user might have desired to cause taping of a talk show because of a planned appearance by a singing star who was to appear on the show. Upon initiating playback, the user would find the screen 50 appearing on the monitor containing, for example, the first 12 scenes or stills selected by the computer in accordance with the invention from the recorded source material. Assuming that none of these scenes contained any indication of a video sequence containing the desired singer, the user would thence page to the next display of scenes which might appear as those depicted in FIG. 4.

The user, in turn, might recognize the face of the desired star as scene 70 and, further, may recognize scene 72 as corresponding to a video sequence of the performance of the singing group associated with the star depicted in frame 70. The user would thus select frames 70 and 72, whereupon the VCR or VCR-computer combination implementing the scene selecting logic of the invention would cause the start of display of material associated with scene 70. When display of this video segment associated with scene 70 was completed, the system 10 would thereafter commence with display of the video segment associated with frame 72. Upon completion of display of the desired video sequences corresponding to the selected frames 70 and 72, the system 10 would return to a display of the screen 50 of FIG. 4 for any subsequent desired operation.

As just noted, the hereinbefore described functions may desirably be implemented in a wide variety of ways. As noted, the VCR 12, in one embodiment, would utilize the attached computer 10 for the processing and storage functions or, in the alternative, would provide for some or all of these functions internally. Scene images or frames such as frame 60–74 shown in FIG. 4 would in one embodiment be stored in internal memory in the VCR 12, which may also desirably include the digitizer and processor. Moreover, it will be readily apparent that the functions hereinbefore described in yet another embodiment would easily be implemented as a stand-alone box which intercepted signals being recorded by the VCR, such box further providing the location information for each recognized scene (e.g., time of the start and end of the scene or video segment).

Figure 6A:
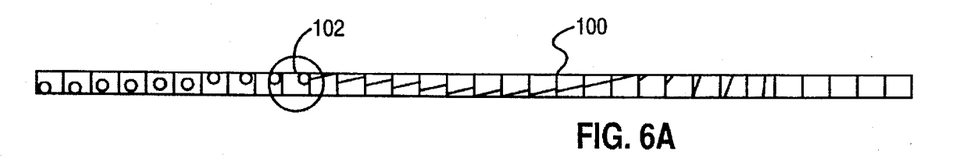
FIG. 6 is an illustrative sequence of scene images to be parsed.
Figure 6B:
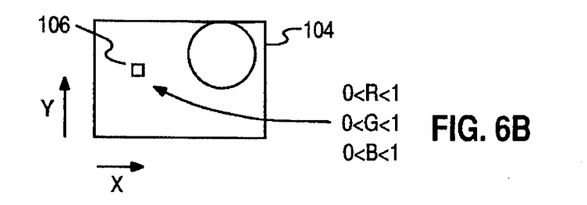

Now that an overall explanation of the operation of the invention has been provided, more detailed description of methods employed in the system 10 will be provided with reference to FIG. 6, as well as a discussion of more detailed information provided by the invention.

The computer 10 of FIG. 1 will preferably be programmed with functions stored in memory causing the method or methods to examine the video frames comprising the video source material after conversion to digital form.

These methods will be implemented so as to recognize changes in frame values and to accordingly execute logic to determine that a scene change is likely. Such method in one embodiment will save value sets from several sequential frames in order to accomplish this scene boundary determination. In passing it will be noted that this process of digitization could be implemented in the system of FIG. 1 solely for the purpose of scene determination whereby the logic of the invention could be executed against video in analog form and even in real time, as well as with respect to video source material previously digitized. Thus, the invention is not intended to be limited solely to video information in the digital video domain, but applies equally well with respect to analog video.

In a preferred embodiment, the methods for discriminating scene changes preferably may be sensitized by optional user controls. For example, the methods will accommodate user-input estimations of number of scenes, accuracy desired and the like, the results of this process, thereafter providing an ordered sequence of entries. In the preferred embodiment, this sequence of still frames such as that shown in FIG. 3 would desirably have a number of properties. First, as previously described, one still frame (or perhaps a few) would be selected in an automated fashion from the processed (e.g., digitized) video to correspond to a segment of video or scene. Such a frame would be selected using one or more methods which might in some instances be entirely suitable as relatively simple methods easily implemented by the digital computer 10. For example, the method might simply provide for selecting the first frame in an associated segment, the middle frame in the associated segment or even the most common frame in the associated sequence.

Next, in the display of the screen 50, the system of FIG. 1 would further desirably provide the starting frame number for the associated scene from the digitized video sequence, as well as the corresponding end frame number. Moreover, the system would also desirably, in one embodiment, determine a value specifying the likelihood that the particular still frame did, in fact, correspond to a true scene boundary. This would permit the user (or even an automated selection process) to effect an informed choice in making decisions about eliminating or combining identified scene segments and corresponding still frames. In some applications, providing for this level of sensitivity of discrimination could be extremely important. In some cases, the fact that some scenes were missed could be an acceptable trade-off for being able to recognize contents of a tape on a single or, at most, a very few display screens 50.

With reference to FIGS. 5A–5C and 6–13, a preferred method will be disclosed for performing the scene parsing. Reference numerals in parenthesis will refer to steps corresponding to flow diagrams of FIGS. 5A–5C performed by the system of FIG. 1. Referring to FIG. 6, there is a sequence of images 100. For each specific image 102, the method measures certain characteristics that together form the "fingerprint" or signature of that image. Later these fingerprints will be compared with those of other images in the sequence of images 102 to determine the points of scene transition.

For each image 102, the method first, as an expedient, reduces the resolution of the image 104 to 1K pixels (80). A weighting factor is preassigned (81) to each of these pixels that puts more emphasis on the central area of the image and feathers the borders to avoid abrupt change as a subject moves slowly out of the frame. Across all pixels 106 of this reduced resolution image, certain summations are performed as listed in Table 1. All are divided by the sum of the weighting factor so in effect each is talking the average of the characteristic across all pixels (82). For example, characteristic number 4, called R2, finds the average of the square of the red value. These sums will be used to derive certain characteristics of the image as stated in the following Table 1 under "scope":

TABLE 1

| number | formulation | name | scope | scope |
|---|---|---|---|---|
| 0 | $\Sigma$ wt | 1 | | |
| 1 | $\Sigma R \cdot wt/\Sigma$ wt | R | overall color and brightness | |
| 2 | $\Sigma G \cdot wt/\Sigma$ wt | G | | |
| 3 | $\Sigma B \cdot wt/\Sigma$ wt | B | | |
| 4 | $\Sigma R^2 \cdot wt/\Sigma$ wt | R2 | texture roughness | palette |
| 5 | $\Sigma G^2 \cdot wt/\Sigma$ wt | G2 | | |
| 6 | $\Sigma B^2 \cdot wt/\Sigma$ wt | B2 | | |
| 7 | $\Sigma R \cdot G \cdot wt/\Sigma$ wt | RG | color diversity | |
| 8 | $\Sigma R \cdot B \cdot wt/\Sigma$ wt | RB | | |
| 9 | $\Sigma R \cdot X \cdot wt/\Sigma$ wt | RX | light position | composition |
| 10 | $\Sigma R \cdot Y \cdot wt/\Sigma$ wt | RY | | |
| 11 | $\Sigma G \cdot X \cdot wt/\Sigma$ wt | GX | | |
| 12 | $\Sigma G \cdot Y \cdot wt/\Sigma$ wt | GY | | |
| 13 | $\Sigma |\Delta_H (R + G)| \cdot wt/\Sigma$ wt | DH | orientation number and boldness of edges | |
| 14 | $\Sigma |\Delta_V (R + G)| \cdot wt/\Sigma$ wt | DV | | |
| 15 | $\Sigma |\Delta_H (R + G)|^2 \cdot wt/\Sigma$ wt | DH2 | | |
| 16 | $\Sigma |\Delta_V (R + G)|^2 \cdot wt/\Sigma$ wt | DV2 | | |

After being summed over each image, these characteristics are further redefined according to the formulas in the following Table 2 to isolate specific characteristics (83). For example, a simple change in brightness will affect P1, but is normalized out of all other parameters. An explanation of the characteristic measured by each variable is included in that illustration. Together these 16 variables are the fingerprint for the specific image as shown in Table 2:

TABLE 2

| number | association | name | formulation | characteristic |
|---|---|---|---|---|
| 1 | R | P1 | $.30R + .58G + .12B$ | brightness (night or day?) |
| 2 | G | P2 | $\dfrac{R - .46G - .54B}{Y + .5}$ | color temperature (warm skin or cold sky?) |
| 3 | B | P3 | $\dfrac{.40R - G + .60B}{Y + .5}$ | secondary axis color (nature scene?) |
| 4 | R2 | P4 | $2\sqrt{\dfrac{R2 - R^2}{R - R^2 + .01}}$ | red variance normed by range limit (blotchy or smooth?) |
| 5 | G2 | P5 | $2\sqrt{\dfrac{G2 - G^2}{G - G^2 + .01}}$ | green variance normed by range limit |
| 6 | B2 | P6 | $2\sqrt{\dfrac{B2 - B^2}{B - B^2 + .01}}$ | blue variance normed by range limit (sky in image?) |
| 7 | RG | P7 | $2\sqrt{\dfrac{\sqrt{R2 \cdot G2} - RG}{\sqrt{R2 \cdot G2} + .01}}$ | red-green color variance normed by range limit (red light of red object?) |
| 8 | RB | P8 | $2\sqrt{\dfrac{\sqrt{R2 \cdot B2} - RB}{\sqrt{R2 \cdot B2} + .01}}$ | temperature color variance normed by range limit (how varied is image color?) |
| 9 | RX | P9 | $\dfrac{2 \cdot RX}{(R + .1) \cdot (X_{max})} - 1$ | horizontal red center of gravity (movement of "warm" object?) |
| 10 | RY | P10 | $\dfrac{2 \cdot RY}{(R + .1) \cdot (Y_{max})} - 1$ | vertical red center of gravity (falling warm object?) |
| 11 | GX | P11 | $\dfrac{2 \cdot GX}{(G + .1) \cdot (X_{max})} - 1$ | horizontal green center of gravity |
| 12 | GY | P12 | $\dfrac{2 \cdot GY}{(G + .1) \cdot (Y_{max})} - 1$ | vertical green center of gravity |
| 13 | DH | P13 | $\dfrac{DH}{[(R + G)/2] - [(R + G)/2]^2 + .05}$ | vertical edge activity (how sharp?) |
| 14 | DV | P14 | $\dfrac{DV}{[(R + G)/2] - [(R + G)/2]^2 + .05}$ | horizontal edge activity (balanced to P13) |
| 15 | DH2 | P15 | $\dfrac{\sqrt{DH2 - DH^2}}{DH}$ | vertical edge boldness (many faint or few bold?) |
| 16 | DV2 | P16 | $\dfrac{\sqrt{DH2 - DH^2}}{DH}$ | horizontal edge boldness (cartoon or natural?) |

Figure 7:
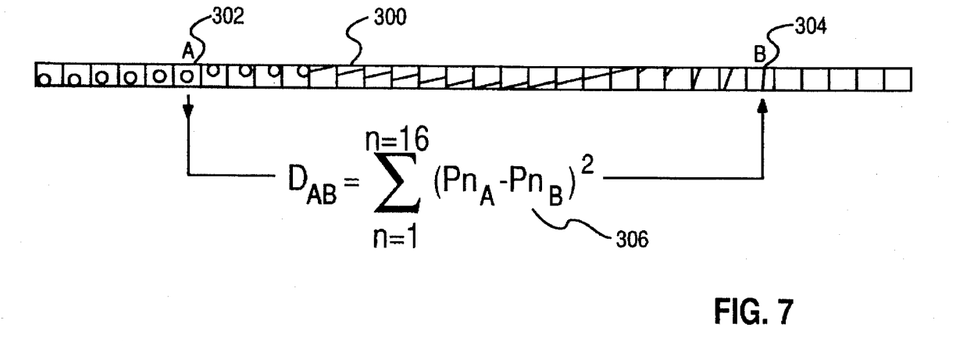
FIG. 7 is an illustration of derivation of image differences for scenes of FIG. 6.

Based on these fingerprints, FIG. 7 illustrates how to derive a difference between two images (84). Given image A 302 and image B 304 selected from a sequence of images 300, the formula 306 calculates the difference between the images by taking the sum of the square of the difference of each individual characterizing parameter in the fingerprints of the two images.

In its most basic form, the system would now look at the difference between adjacent images, and mark a scene change (85) when the difference exceeds a predetermined threshold. Such a simple method is easily fooled by rapid and temporary scene changes, such as people passing in front of the camera or firing a flash, and may miss slow transitions such as fades. The preferred method of FIG. 8 seeks to correct these deficiencies.

Figure 8:
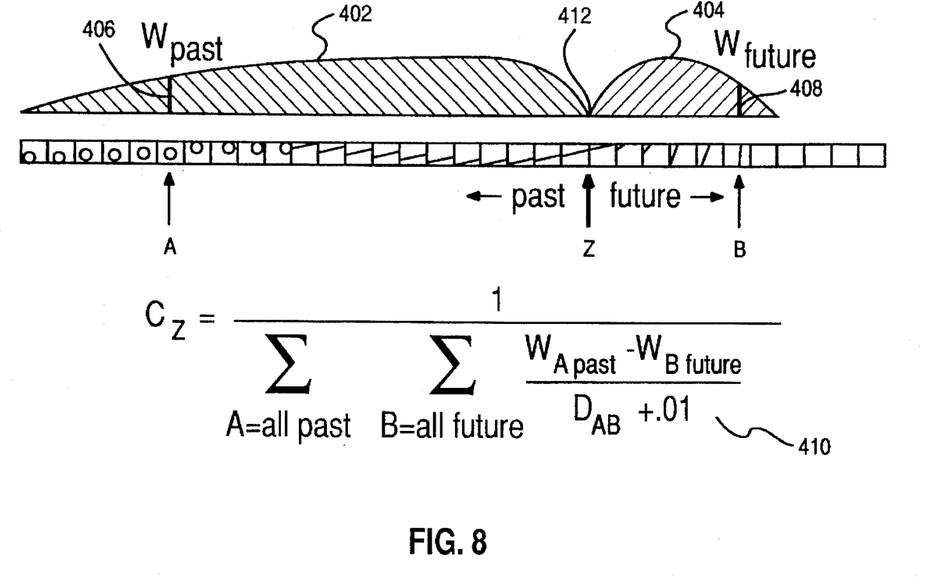
FIG. 8 is an illustration of determination of $C_z$ at time Z.

In FIG. 8, the system is ready to calculate the change "C" at time labeled Z. Two weighting functions, one weighting the past 402 and the other weighting the future 404, are centered on time Z (86). The width of the past 402 is preferably 20 seconds and that of the future 404 is preferably 3 seconds, with a 0.5 second gap between them. A user may modify these numbers. When a temporary scene change occurs, such as a flashbulb, a person moving in front of the camera, or a boat bobbing on the water, the length of the future weighting 404 determines a waiting period for the scene to return before the system marks it as an event to be displayed. The length of the past weighting 402 determines how far back the system looks to find similarities. A short past weighting 402 will better display each scene step, while a longer past weighting 402 will limit selection to the major scene changes, which is usually preferred when prescanning a long story for major events only. The width of the gap 412 determines sensitivity to transition speed. A zero gap width accurately finds only abrupt technical transitions for scanning an unedited master tape for camera startup points. A longer gap emphasizes fades and subject changes, those transitions a user would normally want to see parsed while scanning a commercial tape for subject changes.

Continuing with FIG. 8, the system determines the differences between each scene in the relative future from the current time point Z and each scene in the relative past (87), this difference is weighted by the product of the past and future weighting functions, shown for times A and B as values represented by the length of lines 405 and 408. Because the system looks for similarities rather than differences, it is important to emphasize small differences over large in the average. The method accomplishes this by taking the reciprocal of the average of reciprocals of "D", as given in the formula 410 (90).

Finding the difference between all past and present images is not as tedious as it seems at first. The span of times is limited to those for which the weighting functions are not zero. Once a difference between two images is found, it may be stored (88) and simply recalled rather than recalculated for future times Z. Based on the weighting widths given and a 30 image per second frame rate, the system would need to circulate 600 differences per frame. Finally as an expedient, the system can limit itself to frames every ⅕ of a second rather than ⅟₃₀ of a second with little loss, reducing the number of frames by a factor of 6 and the total calculations by a factor of 36.

Figure 9:
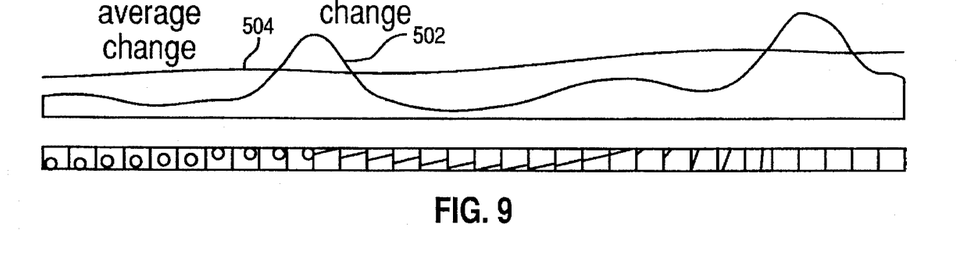
FIG. 9 is a plot depicting changes comprising a difference in the sequence for each image.

Having calculated a difference in the sequence for each image, the system can now plot these changes as illustrated in FIG. 9 as curve 502 (91). As a refining expedient, the system preferably averages this change with a window of 5 minutes to generate a slowly varying average change curve 504 (92). Each sample in the change curve 502 is divided by the square root of the corresponding average change 504 to produce the function curve 520 that the method uses for subsequent processing. This step emphasizes smaller transitions at times when the action is slow, to prevent details from being overlooked, while keeping many scene changes at points of physical action from overloading the system. The square root is used to halve the effect of this normalizing step (93) so action acts do in fact generate more transitions than static acts.

Figure 10:
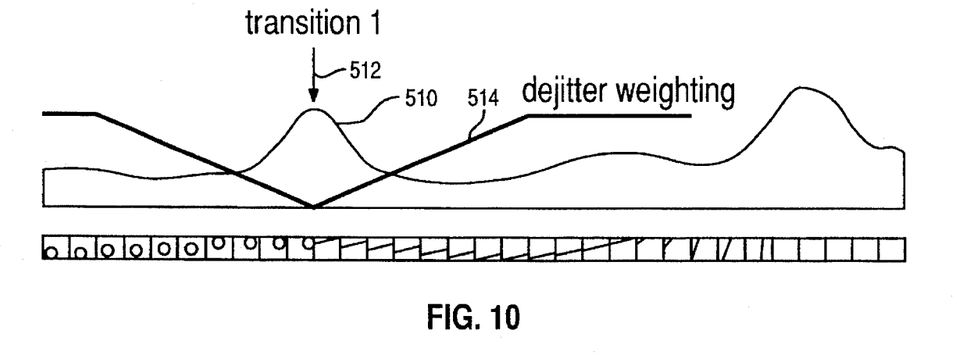
FIG. 10 is a plot of a normalized change curve corresponding to the change curve of FIG. 9.

Having thus normalized the change curve 510 in FIG. 10, the system 10 now picks the point of greatest change 512 marked as transition 1 (94). Following this, the system suppresses changes in the vicinity of that pick (95) by multiplying the change curves 510 by a dejitter weighting function 514 that preferably has a radius of action proportional to the previously discussed future weighting curve width. In this case the preferred radius is 3 second so the total width is 6 seconds. This suppression prevents certain very rapid scene changes done for special effects from overloading the system.

Figure 11:
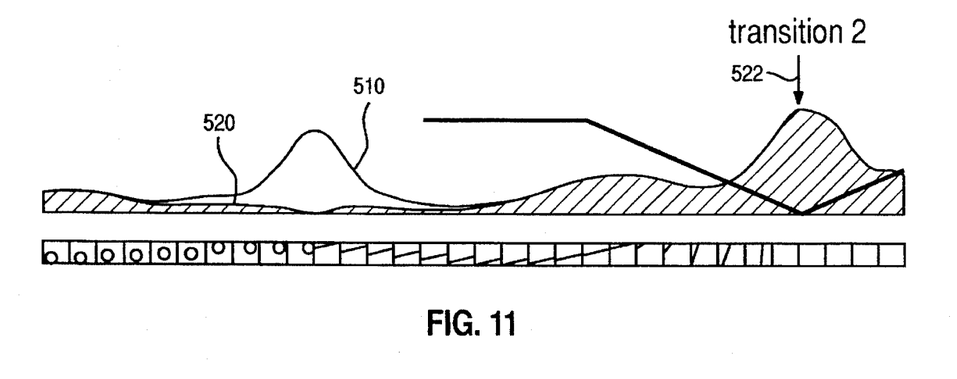
FIG. 11 depicts the search of a revised change curve to locate transitions.
Figure 12:
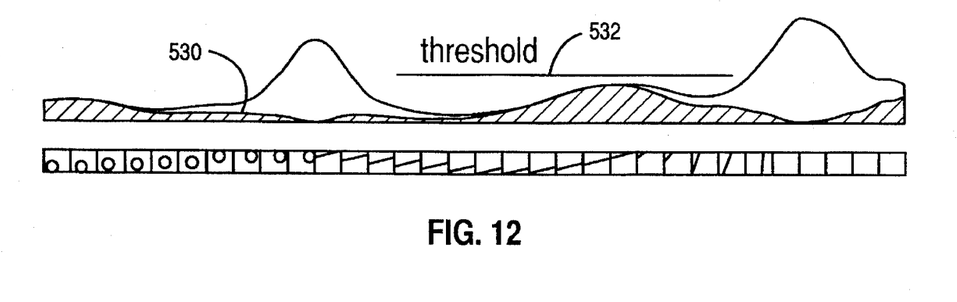
FIG. 12 illustrates completion of location of scene changes corresponding to location of the greatest change remaining below a threshold.
Figure 13A:
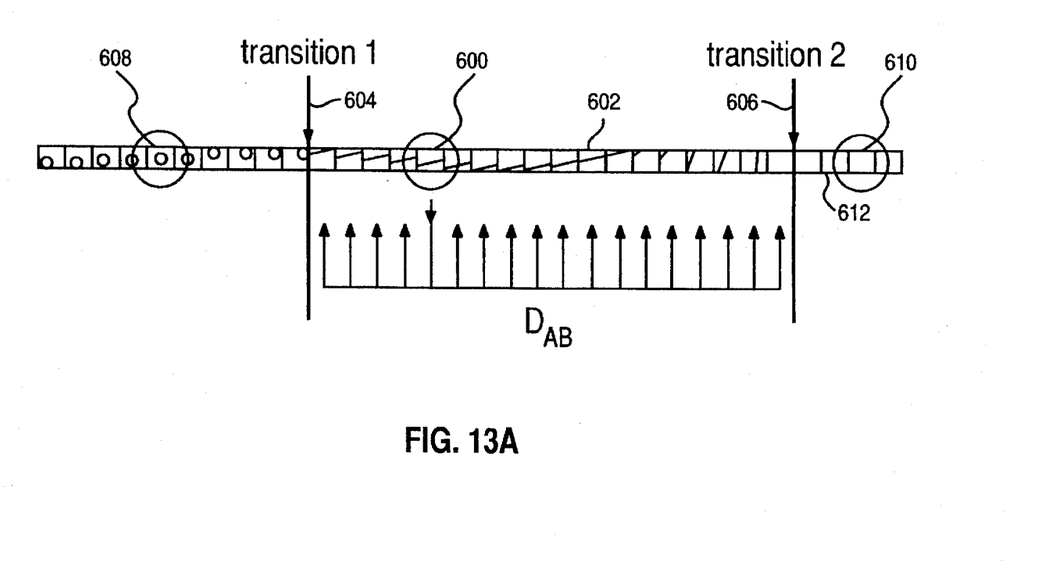
FIG. 13 illustrates location of the most representative image from each scene sequence intended to represent the respective sequence.
Figure 13B:
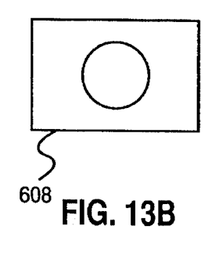
Figure 13C:
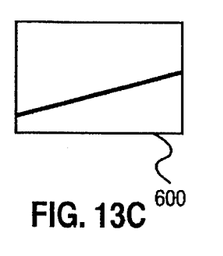
Figure 13D:
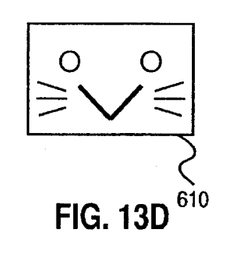

Continuing with FIG. 11, the system 10 searches the revised change curve 520 generated by multiplying the previous change curve 510 with the weighting function 514 selected on the previously found transition 1 (96). The highest value 522 on this revised change curve 520 is marked as transition 2 (97), and the process is iterated to find all the transitions (98).

Eventually the revised change curve will have yielded all major transitions. When the greatest change remaining is below a threshold 532 in FIG. 12, the system 10 declares all scene changes found. This threshold may be fixed or it may vary, starting low and rising with the number of found scene changes. In an exceedingly boring sequence where few changes were found, the threshold would remain low, encouraging even subtle changes to be flagged, while parsing a long action movie, the system would limit selection to major events so the basic story could be viewed on a single screen of still images.

Once the system 10 has determined all relevant scene changes it attempts to find the most representative image from each scene sequence to represent that sequence. It does this according to a method explained with reference to FIG. 13. For an image 600 in the sequence 602 between transition 1 604 and transition 2 606, the system finds the change between every other image in that sequence (99). The average of that difference measures how well that image 600 represents that entire scene (101). This process is repeated for all other images in the sequence (103), and the image with the lowest average difference best represents that scene (105). In this case the system has identified image 600 as best representing scene 602, and the Cheshire cat 610 as best representing the final scene 612 following transition 2.

While the invention has been shown and described with reference to particular embodiments thereof, it will be understood by those skilled in the art that the foregoing and other changes in form and detail may be made therein without departing from the spirit and scope of the invention.

We claim:

1. A method for use in a computer system for editing video comprised of a sequence of video segments comprising
   automatically analyzing with said system contents of said video said analyzing step comprising the steps of;
   deriving characteristics of different images of said video segments corresponding to palette and composition; and
   generating fingerprints corresponding to said different images;
   automatically selecting, in response to said analyzing, video segment frame boundaries between said segments with said computer, said automatically selecting step comprising the step of
   generating first weighting functions each associated with different images of said one of said segments of video and corresponding to the past;
   displaying indicators each corresponding to and representing one of said boundaries; and
   automatically detecting a most representative image from said different images of said one of said segments comprising the steps of
   determining a change difference between images comprising said one of said segments;
   measuring the average of said change difference between said images; and
   selecting as said most representative image one of said images in said one of said segments with the lowest said average.

2. The method of claim 1 further including
   selecting one of said indicators; and
   displaying one of said video segments comprised of a sequence of frames of said video corresponding to said one of said indicators in response to said selecting.

3. The method of claim 2 including
   selecting a next one of said indicators; and
   displaying a next one of said video segments comprised of a next sequence of frames of said video corresponding to said next one of said indicators in response to said selecting a next one of said indicators.

4. The method of claim 3 wherein said one of said indicators corresponds to a frame of video from said sequence of frames and said next one of said indicators corresponds to a frame of video from a said next sequence of frames.

5. The method of claim 4 wherein said step of displaying indicators comprises displaying said indicators in a physical sequence corresponding to a sequence in which one of said said segments of video and said next one of said segments of video is to be displayed.

6. The method of claim 5 further including reordering said indicators after said displaying of said indicators in said physical sequence to change said physical sequence and further to change said corresponding sequence in which said one of said segments of video and said next one of said segments of video is to be displayed.

7. Apparatus for use in a computer system for editing video comprised of a sequence of video segments, comprising means for automatically analyzing with said system contents of said video, said means for analyzing comprising means for deriving characteristics of different images of said video segments corresponding to palette and composition;

means for generating fingerprints corresponding to said different images;

means for automatically selecting, in response to said analyzing, video segment frame boundaries between said segments with said computer, said means for selecting including means for generating first and second weighting functions each associated with different images of said one of said segments of said video and said next one of said segments of video respectively;

means for determining difference between at least one of said first functions associated with different images of said one of said segments and at least one of said second functions associated with different images of said next one of said segments of video;

means for displaying indicators each corresponding to and representing one of said boundaries; and means for automatically detecting a most representative image from said different images of said one of said segments comprising means for determining a change difference between images comprising said one of said segments;

means for measuring the average of said change difference between said images; and means for selecting as said most representative images one of said images in said one of said segments with the lowest said average.

8. The apparatus of claim 7 further including means for selecting one of said indicators; and means for displaying one of said video segments comprised of a sequence of frames of said video corresponding to said one of said indicators in response to said selecting.

9. The apparatus of claim 8 including selecting a next one of said indicators; and displaying a next one of said video segments comprised of a next sequence of frames of said video corresponding to said next one of said indicators in response to said selecting a next one of said indicators.

10. The apparatus of claim 9 wherein said one of said indicators corresponds to a frame of video from said sequence of frames and said next one of said indicators corresponds to a frame of video from said next sequence of frames.

11. The apparatus of claim 10 further including means for displaying said indicators in a physical sequence corresponding to a sequence in which each said segment of video is to be displayed.

12. The apparatus of claim 11 further including means for re-ordering said indicators after said displaying of said indicators in said physical sequence to change said physical sequence and further to change said corresponding sequence in which said one of said segments of video and said next one of said segments of video is to be displayed.

13. The apparatus of claim 8 the further including means for selecting one of said first and second functions in response to said means for determining difference as corresponding to one of said segment boundaries.

14. The apparatus of claim 7 further including means for displaying said indicators in a physical sequence corresponding to a sequence in which said one of said segments of video and said next one of said segments of video are desired to be displayed.

* * * * *